United States Patent Office 2,880,061
Patented Mar. 31, 1959

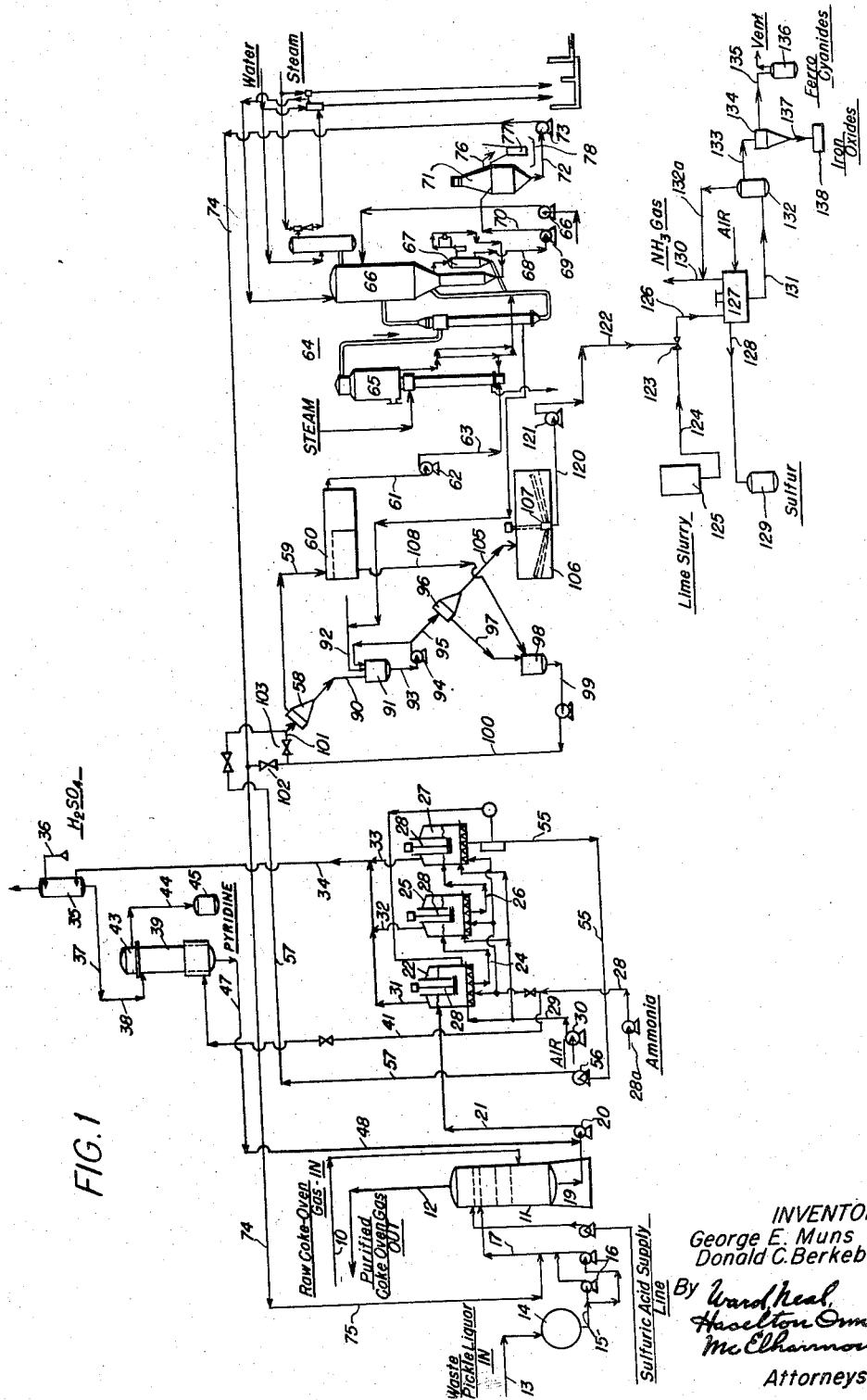

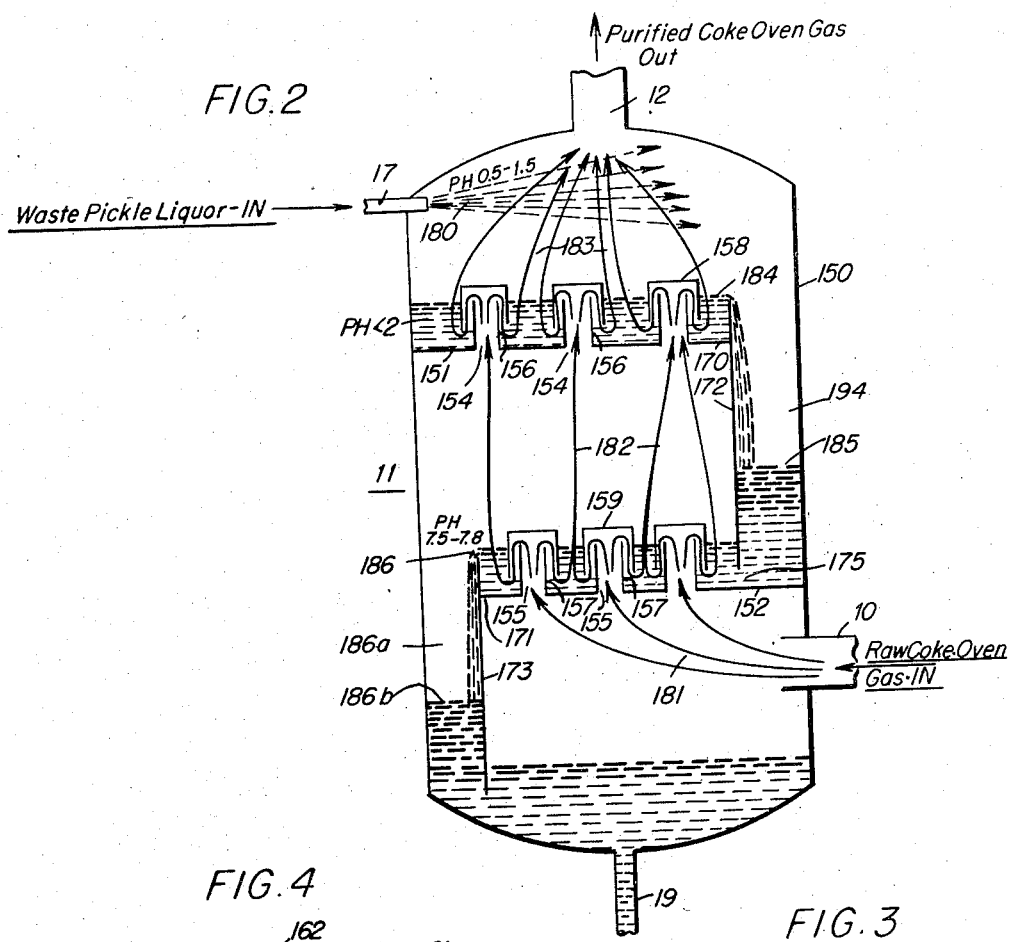
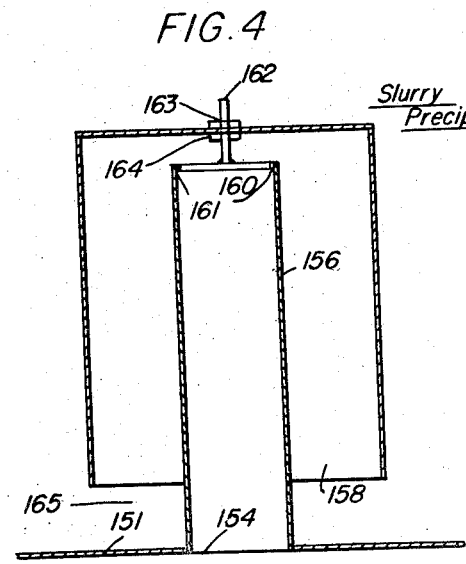
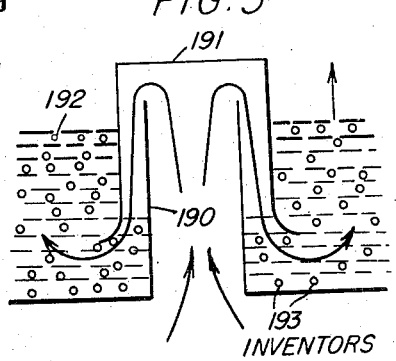

2,880,061

PROCESS FOR RECOVERING USEFUL VALUES FROM WASTE PICKLE LIQUOR AND RAW COKE OVEN GAS

George E. Muns, Industry, and Donald C. Berkebile, Beaver, Pa., assignors to Crucible Steel Company of America, Pittsburgh, Pa., a corporation of New Jersey Application June 20, 1955, Serial No. 516,698

7 Claims. (Cl. 23—77)

This invention pertains to novel processes of reacting waste sulfuric acid pickle liquor from steel mills and the like, with raw coke oven gas in such manner and under such conditions as to recover a number of valuable products, with substantially no residual waste materials.

Spent pickle liquor resulting from the cleaning of steel with sulfuric acid, is substantially an aqueous solution of ferrous sulfate $FeSO_4$ and sulfuric acid $H_2SO_4$. In order to prevent stream pollution by discharge therein of the waste pickle liquor as such, it has heretofore been treated with lime to neutralize the free acid and precipitate the iron, the resulting sludge comprising principally iron oxide and calcium sulfate in aqueous suspension. The sludge however is of no value.

Raw coke oven gas contains the valuable constituents, ammonia $NH_3$, hydrogen sulfide $H_2S$, hydrogen cyanide $HCN$, and pyridine $C_5H_5N$. The ammonia is customarily recovered as ammonium sulfate by scrubbing the gas with sulfuric acid. This operation also removes a variable proportion of the pyridine and its homologs, known collectively, as the "tar bases," from which these constituents may be recovered. No attempt is ordinarily made to recover the hydrogen sulfide or cyanide values.

In the process of the present invention, raw coke oven gas is reacted with spent pickle liquor instead of with fresh sulfuric acid. This results in conservation of the scarce raw material, i.e., sulfuric acid. The process of the present invention is such, as described below, as to result in the recovery of ammonium sulfate, iron oxide, elemental sulfur, pyridine and ferrocyanides, as well as the resultant substantially purified coke oven gas, which is thus rendered a suitable source of heat for steel mill applications.

The process of the invention will now be described with reference to the accompanying drawings wherein:

Figure 1 comprises a flow sheet diagramatically illustrative of the preferred form of practising the invention.

Figure 2 illustrates schematically in axial section a preferred form of contacting or absorption tower for reacting the raw coke oven gas with the waste pickle liquor at the initial stage of the process.

Figure 3 is an enlarged schematic view in axial section of one of the so-called bubble caps employed in the Figure 2 construction for intimately contacting the coke oven gas and spent pickle liquor for effecting the reactions between them described below.

Figure 4 is an enlarged view in axial section of of one of the bubble caps illustrating the details of mechanical construction thereof.

With reference, more particularly at the moment to Figure 1 of the drawings, the process is as follows:

*Step 1.*—Coke oven gas, after passing through the de-tarrers of the coke plant, is fed thence over a supply line 10 to the base of an absorption column 11, from whence it flows upwardly through the column ultimately escaping through the top, in purified state, as described below, over an outlet conduit 12. Waste sulfuric acid pickle liquor is fed over a conduit 13, into a storage tank 14, from whence it is drawn off at the base over a conduit 15, and pumped thence by means of pumps 16, over conduit 17, into the top of the absorption column 11. From this point it flows downwardly through a series of contacting stages, countercurrently to the flow of coke oven gas rising upwardly within the column, as described more in detail below with reference to Figs. 2 and 3. As a result, reactions take place for removing the ammonia, hydrogen sulfide, hydrogen cyanide and pyridine from the gas, by reaction of these constituents present in the coke oven gas, with the free sulfuric acid and ferrous iron sulfate of the pickle liquor, the operating conditions being properly controlled to this end.

Operation of the absorption step with this single countercurrent passage of the gas and liquor through the column produces a pH gradient down through the column. The low pH of the entering pickle liquor at the top of the column, which ordinarily is on the order of about 0.5–1.5 is increased as it passes down through the column removing ammonia and pyridine bases from the ascending gases. This assures maximum removal of the basic or alkaline constituents from the gas, since the gas, substantially free of these components, will, at the top of the column, contact the incoming free acid of the unreacted pickle liquor, whereby residual alkaline constituents present in the gas will be eliminated.

The reaction rate is so adjusted that the slurry leaves the base of the column at a pH of not leéss than 7.5 or above 7.8. The lower pH value assures substantially complete reaction of the ferrous iron to insoluble iron sulfide and complex iron-ammonium ferrocyanides, the pyridine to complex ferrocyanides, and the sulfate radical to ammonium sulfate. The higher pH value aforesaid approximates the upper limit at which the complex ferrocyanides will remain insoluble and not contaminate the ammonium sulfate.

Thus the purpose of the absorption tower is to contact crude, detarred coke oven gas with waste pickle liquor. The chemical reactions which take place within the tower include the reaction of ferrous sulfate, present in the pickle liquor, with the ammonia and hydrogen sulfide in the coke oven gas to form ferrous sulfide and ammonium sulfate as follows:

(1)   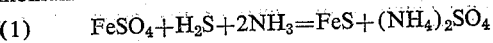 $FeSO_4 + H_2S + 2NH_3 = FeS + (NH_4)_2SO_4$

For the reaction to go to substantial completion, there must be an excess of hydrogen sulfide over the stoichiometric amount required for this reaction. In addition to the reaction given above essentially all of the hydrogen cyanide in the gas reacts with ferrous sulfate and ammonia to form a complex ferrous ammonium ferrocyanide. The following chemical equation represents the approximate reaction:

(2)   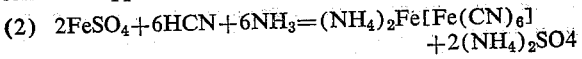 $2FeSO_4 + 6HCN + 6NH_3 = (NH_4)_2Fe[Fe(CN)_6] + 2(NH_4)_2SO_4$

The free acid in the pickle liquor and any added acid reacts only with the ammonia in the gas, to form ammonium sulfate according to the following reaction:

(3)   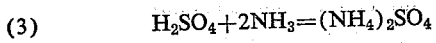 $H_2SO_4 + 2NH_3 = (NH_4)_2SO_4$

Under properly controlled conditions, as described below, the ferrocyanide complex is essentially completely insoluble in the solution and is retained with the insoluble ferrous sulfide. In order for the ferrous cyanide complex to be formed as an insoluble material, it is necessary for the reaction to take place at a pH of 7.8 and under. The conversion of that portion of the ferrous iron, which does not react with the cyanide, to form ferrous sulfide takes place best at a pH above 7.5. Thus, when the liquid in the bottom of the absorption tower is maintained at a pH in the range of 7.5 to 7.8, all of the hydrogen cyanide reacts to form the insoluble ferrous ammonium ferrocyanide complex, and all of the remaining iron is converted by the hydrogen sulfide to insoluble ferrous sulfide.

In the absorption column, pyridine is also removed from the coke oven gas, under the conditions aforesaid, by reaction with the ferrocyanides (formed from the HCN of the gas and the iron of the pickle liquor) in the slurry, to form insoluble or sparingly soluble complex ammonium metallo-organic compounds, thus effecting the complete removal of the pyridine from the gas. The pyridine of these compounds is not displaced by stronger bases, such for example as the ammonia of the coke oven gas, and therefore leaves the absorption column in the slurry produced.

The temperature at which these absorption reactions are carried out, is not critical, owing to the high solubilities and reaction rates of the starting substances involved, and may therefore be governed by the temperature of the entering coke oven gas, which in turn is governed by the coke oven plant operation. This temperature will normally fall in the range of about 45° to 55° C.

In the absorption tower reaction, the temperature at which the waste pickle liquor is fed in, in relation to the coke oven gas temperature, should be high enough to take advantage of the unsaturated condition of the gas to effect some evaporation of the liquid from the slurry, but not so high as to cause excessive evaporation and thickening of the slurry to the point where it causes plugging of the column. On the other hand, the feed temperature should not be so low as to cool the gas below its dewpoint with resultant condensation of naphthalene and moisture present therein. The naphthalene will produce plugging of the column and the water would have to be evaporated in a later step.

By virtue of the foregoing precautions, the absorption column may be operated in a manner such that only a single counterpass of the reacting constituents is required, thus eliminating any necessity for recirculation of partially reacted pickle liquor. By adjusting the rates of flow of the pickle liquor and coke oven gas, a fully reacted slurry is obtained which leaves the base of the column at a pH of approximately 7.5 to 7.8. Since the rate of flow of coke oven gas is fixed by operation of the coke plant, the condition of the slurry leaving the absorption column is controlled by regulating the rate of flow of waste pickle liquor to the column.

*Step 2.*—The slurry from the absorption step is drawn off from the base of the absorption column over a conduit 19 and pumped by means of a pump 20 over a conduit 21 into the top of an oxidizing vessel, as at 22, or to several such vessels in series, as at 22–27, inc., in order to provide continuous oxidation of the slurry. The oxidation is effected by means of induced air with the constant agitation of a motor driven stirrer or stirrers, as at 28. If additional air is required, it may be blown in through the base of the oxidizers over a supply line 29, provided with a blower 30, extending from the plant air supply source.

During oxidation, the iron sulfide present in the entering slurry is oxidized to iron oxide and free sulfur in accordance with the following equation:

(4) $\quad 4FeS + 3O_2 = 2Fe_2O_3 + 4S$

The complex iron-ammonium ferrocyanides are oxidized to ferroso-ferric ammonium ferrocyanides accompanied by the release of small quantities of ammonia. The complex ferrocyanides of pyridine are also decomposed releasing pyridine as such.

On oxidation, the higher the pH the more rapidly the oxidation occurs. However, the pH should not exceed 7.8, since, as above explained, if oxidation occurs above this pH, the ferrocyanides remain in solution throughout the remainder of the process and appear in the final crystallized ammonium sulfate as a blue pigmenting effect which impairs salability.

On the other hand, the lower the pH, the slower the oxidation. For example, if the slurry comes to the oxidizer at a low pH, i.e., well below 6.8, it will contain soluble iron salts such as ferrous sulfate, which react with oxygen and water present as follows:

(5) $\quad 2FeSO_4 + 1½O_2 + 2H_2O = Fe_2O_3 + 2H_2SO_4$

Thus, as shown by the above reaction, the oxidation under these conditions produces free sulfuric acid which further lowers the pH until it progressively slows down the reaction to some minimum and practically inoperable level. Accordingly, under these conditions of reaction, free ammonia must be added to control the pH and maintain the reaction, which introduces an item of added complication.

As the slurry enters the oxidation chamber, it contains iron sulfide and iron cyanides in precipitated form. During the oxidation the iron sulfide is preferentially oxidized to iron oxide leaving the complex iron cyanides insoluble, so long as the slurry contains a small but appreciable amount of unoxidized iron sulfide. Thus the iron sulfide should be held above a critical minimum level of about 0.2–0.5% by weight of the total slurry. If the iron sulfide falls below this critical minimum, then the complex iron cyanides will be oxidized to form soluble cyanide compounds which appear as contaminants in the final crystallized ammonium sulfate.

With the above mentioned amount of residual iron sulfide present the solids can be more easily separated from the slurry than otherwise. This residual iron sulfide retained at this stage is oxidized to completion in the subsequent stage of solubilizing the ferrocyanides and the sulfur thus freed, and separated by flotation, as explained below.

If the slurry from the absorption column has been reacted therein to substantial completion to form insoluble iron sulfide and complex iron ferrocyanides, and therefore contains only traces of partially soluble ferrous hydroxide or other soluble iron compounds, there will not be a sufficient drop in the pH value, during oxidation, to require the addition of ammonia to maintain the pH level at that necessary for a rapid oxidation rate. The lower pH limit for rapid oxidation is, as stated, around 6.8, while the upper limit, namely that at which the ferrocyanides become soluble, is about 7.8. Avoidance of ammonia additions to the oxidizer minimizes the formation of undesirable thiocyanates. Ammonia, however, may be introduced into the oxidizing vessels over a supply line 28, containing a pump 28a, to correct transient abnormal conditions, in order to restore the pH where necessary within the range aforesaid.

Operation of the oxidation step without the addition of ammonia, is effected by producing a slurry in the absorption step in which the iron is substantially completely reacted to sulfide and complex ferrocyanides as aforesaid, and which contains enough dissolved ammonia to prevent a drop in pH during oxidation below the aforesaid range necessary for a rapid oxidation rate. Such operation affords several advantages: It eliminates the expense and bother of handling ammonia at this stage, and it also eliminates pH control during the oxidation. The hazard of adding ammonia at this stage under normal conditions of operation, results from the fact that such addition in the presence of the free sulfur, cyanides and oxygen present in the oxidizer, provide ideal conditions for the formation of thiocyanates. The formation of small quantities of ammonium thiocyanate in the absorption step cannot be avoided since some thiocyanate is present in the raw coke oven gas. However, further thiocyanate formation is held to a minimum in accordance with the present invention by carrying out the oxidation without the addition of ammonia, as aforesaid.

The slurry from the absorption column 11 will have, as above stated, a temperature between about 45° and 55° C., and hence is introduced into the oxidizer 27 at about this temperature. The oxidation is exothermic so that the temperature in the oxidizers will tend to rise somewhat.

The stripping action of the water vapor and diffused air as facilitated by the heat produced as aforesaid, will release the pyridine and cause it to rise and escape from the top of the oxidizers over conduits 31–34, inc. The pyridine is recovered from the ascending admixture of pyridine, air, etc., by passing the same thence into the base of a scrubber 35, into the top of which an aqueous sulfuric acid solution, of, for example, 5–10% concentration, is introduced over a supply line 36. The pyridine sulfate thus formed is drawn off from the base of the scrubber 35 over conduits 37, 38, and is introduced thence into a pyridine stripper 39, wherein the pyridine is recovered as such by reacting with ammonia introduced into the base of the stripper 39 over lines 28, 41, extending from the ammonia still. The pyridine vapors escape from the top of the stripper 39, into a condenser 43, from whence the pyridine is drawn off over a conduit 44, into a storage tank 45. The "bottoms" from the pyridine stripper, consisting principally of ammonium sulfate, are returned to the oxidizers 22–27, inc., over conduits 47, 48, and thence through the pump 29 and over conduit 21. In the oxidizer any unstripped pyridine is caught and again volatilized and passed thence back to the stripper, while the alkalinity in these "bottoms" assists in maintaining the appropriate pH level in the oxidizers 22–27, inc. Other equivalent means may, of course, be employed for separating and isolating the pyridine.

*Step 3.*—The oxidized slurry is drawn off from the base of the oxidizer 27 over a line 55 and fed thence through a pump 56 and over a line 57 into a first stage centrifuge 58. The ammonium sulfate overflow from the first stage centrifuge is piped over conduit 59 into a decanter vessel 60. The underflow from the first stage centrifuge 58, is fed over a line 90 into a tank 91, wherein it is reslurried with water supplied over a line 92, and is pumped thence over line 93, pump 94, and line 95, into a second stage centrifuge 96, for further ammonium sulfate recovery. The overflow from this centrifuge 96 is fed over a line 97 to a storage tank 98 from whence it may be recycled to the absorption column 11 over lines 99, 100, 74, 75, 17, as feed dilution; or alternatively may be combined with the feed to the first centrifuge 58, over lines 99, 100, 101, suitable valves 102, 103 being interposed in lines 100, 101, for this purpose, as shown. The underflow comprising the concentrated slurry from the second stage centrifuge 96 is fed over line 105 into a tank 106, provided with a motor driven agitator 107.

The decanter vessel 60 has a storage or holding capacity sufficient to allow time for any residual iron present in the clarified ammonium sulfate solution, to oxidize and drop out of solution. The sludge which settles out in the decanter vessel 60 is withdrawn over line 108 into the storage vessel 98 for recycling as aforesaid.

The decanted ammonium sulfate solution is pumped over a line 61 through pump 62 and line 63 into a suitable type of evaporator-crystallizer, such as a "two-effect," evaporator 64 of conventional design, including first effect and second effect evaporating units 65, 66, for concentration and crystallization, the concentrated crystalline slurry from which is deposited in a storage tank 67. From tank 67 the slurry is pumped over the line 68, through pump 69 and line 70 to a centrifuge 71, wherein the crystals are dewatered and substantially dried. The overflow from the centrifuge comprising saturated ammonium sulfate solution containing minor impurities, is recycled to the absorption tower 11 over line 72, pump 73 and lines 74, 75. The centrifuged ammonium sulfate crystals are fed from the centrifuge through a line 76 and chute 77 onto a suitable conveyor 78 for final drying.

The agitated slurry in tank 106 is drawn off from the base thereof over line 120 and pumped through pump 121 and over line 122 to a mixing nozzle 123 wherein it is mixed with an aqueous alkali solution, such as sodium or potassium hydroxide, or alkali slurry, such as a lime slurry, supplied over a line 124, from a tank 125. The mixture then flows over a line 126 into an air flotation system of conventional design 127 from which the free sulfur present in the slurry is floated off over a line 128 into a sulfur storage tank 129. The alkaline agent reacts with the ammonium ferrocyanide present in the slurry to release ammonia and form soluble alkali-ferrocyanide. The gaseous ammonia released at this stage passes off over line 130, and is introduced into the base of the pyridine absorber 35. The slurry comprising the soluble alkali-ferrocyanides and iron oxide is drawn off from the base of the flotation system and pumped over line 131 into a reactor tank 132, wherein the slurry is heated sufficiently, for example, to boiling, to complete the conversion of the ferrocyanides initiated in the flotation system 127 and to substantially complete the removal of ammonia. The additional ammonia thus evolved passes off over line 132a and thence to line 130 for recovery of the ammonia as aforesaid. The heated slurry from reactor 132 is drawn off over line 133 into a centrifuge 134, the overflow from which containing the ferrocyanides in solution, is delivered over a line 135 to a storage tank 136, and the underflow from which comprising iron oxide is delivered over a line 137 to a storage bin 138. The storage tank 136 is preferably heated sufficiently to evaporate excess water and thus concentrate the alkali-ferrocyanides according to commercial requirements. A portion of the alkali-ferrocyanides may be recycled to the alkali tank 125 for mixing with fresh alkali.

For increased removal of hydrogen sulfide from the raw coke oven gas and greater sulfur production, a portion of the final iron oxide from bin 138 may be recontacted with the raw coke oven gas, for example, by reslurrying and recycling to the absorption tower 11. Also for removal of residual alkali-ferrocyanides from the iron oxide deposited in bin 138, it may be reslurried with water and centrifuged.

Reference will now be had to Figs. 2–4, inc., for a description of a preferred form of absorbing tower for practising the invention. The absorber 11 comprising a vertical housing 150, is closed except for the inlet conduits 10 and 17, and outlet conduits 12, 19. Mounted within the housing and extending from the opposite sidewalls in staggered relation at successive levels, are shelf-like supporting partitions, as at 151, 152. These partitions are perforated at spaced intervals, as at 154, 155, for mounting open-ended, upright tubular members, as at 156, 157, the upper portions of which are closed over by cup-like members, as at 158, 159, mounted in spaced relation to their associated tubular members, as shown, to provide passageways for gaseous flow through the partition apertures 154, 155, and thence upwardly through the tubular members 156, 157, thence downwardly between the tubular members and the cup-like covering members 158, 159, and thence outwardly and upwardly between the lower edges of the cup-like members and the partitioning members 151, 152.

The associated tubular and cup-like members 156, 158, and 157, 159, comprise so-called "bubble caps" and are constructed and mounted in appropriately assembled relation as shown in Fig. 4. Referring to this figure, the tubular member 156, is welded about its basal periphery to the supporting partition 151, within the partition aperture 154. The upper end of tube 156 is spanned by an open web or spider 160, welded to tube 156, as at 161. The web 160, mounts an upstanding threaded stud 162, on which is removably secured between lock nuts 163, 164, the cup-like covering member 158. As shown, the cup-like member spans and envelops the tubular member in spaced relation over the greater portion of its height leaving, however, a space, as at 165, for the outflow of gases between the lower edge of member 158 and the partition 151.

Reverting to Fig. 2, the horizontally disposed shelf-like partitions 151, 152, have welded or otherwise secured to their respective terminal edges 170, 171, vertically extending overflow partitions 172, 173, which extend above the horizontal partitions 151, 152, respectively, to a height somewhat less than the height of the tubular members 156, 157, thus to form overflow weirs, as shown at 184, 186. The upper vertical partition 172 extends from above the upper horizontal partition 151, thence downwardly to a distance somewhat above the lower horizontal partition 152, thus to leave space, as at 175, whereby the liquid overflow from the weir formed by the upper portion of partition 172, may flow along the lower horizontal partition 152, to the lower weir provided by the upper portion of partition 173, and to overflow the latter at the overflow level set thereby. The lower vertical partition 173 extends from the weir height above the lower horizontal partition 152, down to the sump or lower portion of the housing 150.

In the operation of the absorber, the raw coke oven gas flows under pressure into the lower portion of the absorber housing 150 through the inlet pipe 10, while at the same time the waste pickle liquor is fed into the upper portion of the absorber housing over conduit 17, and is preferably sprayed into the housing as at 180. The entering coke oven gas flows upwardly, as at 181, through the lower tier of bubble caps 157, 159, thence upwardly as at 182, and through the second tier of bubble caps 156, 158, escaping thence, as at 183, through the outlet conduit 12 at the top of the absorber. Meantime the waste pickle liquor, sprayed into the top of the absorber, as at 180, encounters and reacts with the coke oven gas escaping at 183, and falls thence onto the upper horizontal partition 151, where it accumulates to a liquid level such as to overflow the weir formed by vertical partition 172, as at 184. The partition 172 extends downwardly from the plate 151 to a short distance above the plate 152. The clearance between the partition 172 and the plate 152 is such as to permit the free flow of liquid from the passage 194 onto the plate 152. At the same time the partition 172 must extend low enough so that it is sealed by the normal liquid level on plate 152. The liquid in the passage 194 will build up to a height 185 due to the difference in vapor pressure in the space above plate 152 and that above 151. This pressure difference is equal to the pressure drop of the vapor passing through the bubble caps on the plates 152, and 151, respectively. Similarly, the liquid which flows onto plate 152 from the passage 194 will accumulate to a height sufficient to overflow the weir 186 formed by an extension of the top of the vertical partition 173. The vertical partition 173 extends downwardly into the bottom of the vessel 11 and is sealed in passage 186a in a manner similar to that in passage 194, the liquid accumulating to a height 186b determined by the pressure drop of the gas through the bubble caps on plate 152. A liquid seal at the base of the absorber is maintained by a conventional type of control system. Thus, under steady state conditions the waste pickle liquor flows downwardly through the reactor from the inlet pipe 17 onto the plate 151 overflowing into passage 194, from which it flows onto and across the plate 152 and overflows the weir 186 into the passage 186a and thence into the bottom of the vessel and to the outlet 19. The coke oven gas entering through passage 10 flows upwardly through bubble caps on plates 152 and 151 in succession where it is contacted with the descending pickle liquor. It then contacts the spray of liquid entering through the inlet manifold 17 and leaves the reactor through passage 12.

Fig. 3 illustrates the mechanical interaction between the coke oven gas and the pickle liquor occurring in each bubble cap. The pressure of the coke oven gas flowing upwardly through the tubular member 190 of the bubble cap, prevents the pickle liquor 192 from entering the same, and the same condition holds for the space between the tubular member 190 and the enclosing cap 191, due to the pressure of gaseous outflow. As the gas flows out below the lower edge of the cap 191, it thus bubbles upwardly through the pickle liquor, as at 193, thus intimately admixing the two to produce the reaction above described.

As above stated, reverting now to Fig. 2, the pH of the entering pickle liquor is about 0.5 to 1.5, at which pH it is sprayed, as at 180, through the escaping coke oven gas from which the greater portion of the reacting constituents have been removed by the reaction occurring at lower levels of the absorber. The low pH of the entering pickle liquor thus removes the residual reacting constituents of the escaping coke oven gas and thus substantially completes its purification before it escapes through the outlet conduit 12. As a result of this initial reaction and the further reaction occurring between the coke oven gas and the pickle liquor within the upper tier of bubble caps, the pH of the pickle liquor as it escapes over the weir of the upper vertical partition 172, has a value of about 2 or under. The pickle liquor at a pH of 2 or under, descends through the passageway 194 onto the plate 152, where it is rapidly mixed with the liquid on this plate at a pH of 7.5 to 7.8. In this manner, the presence of any appreciable amount of liquid in the pH range between 3.5 and 6.5 is avoided.

By arranging the pH rise in the manner above described, clogging of the bubble caps is eliminated. In the pH range of about 3.5 to 6.5, the reacted slurry is quite sticky and would clog up the bubble caps. On the other hand, at pH values well below and above this sticky range and at which the reactions are carried out in the upper and lower tiers of bubble caps, respectively, the slurry is not sticky and therefore does not produce clogging of the bubble caps.

This application is a continuation-in-part of our co-pending application Serial No. 374,088, filed August 13, 1953, now abandoned.

What is claimed is:

1. The method of treating iron sulfate containing pickle liquor with raw coke oven gas for purifying said gas and recovering useful values which comprises: reacting raw coke oven gas with iron sulfate containing pickle liquor and completing the reaction at a pH of about 7.5–7.8, thereby to precipitate substantially all ferrous iron present as insoluble iron sulfide and ammonium-ferrocyanides in an aqueous slurry containing ammonium sulfate in solution, oxidizing the entire resulting slurry to convert the iron sulfide into insoluble iron oxide and free sulfur, continuing the oxidation until the iron sulfide is reduced to not less than about 0.2–0.5% by weight of the total slurry, separating the ammonium sulfate solution from said slurry, separating the sulfur from the resulting slurry by flotation, treating the residue with alkali to solubilize the ferrocyanides, and separating the solubilized ferrocyanides from the insoluble iron oxide.

2. The method of treating iron sulfate containing pickle liquor with raw coke oven gas for purifying said gas and recovering useful values which comprises: reacting raw coke oven gas with iron sulfate containing pickle liquor, completing the reaction at a pH of about 7.5–7.8, thereby to precipitate substantially all ferrous iron present as insoluble iron sulfide and ferrocyanides, and to precipitate all pyridine present as complex pyridine ferrocyanides, in aqueous ammonium sulfate solution, oxidizing the resulting slurry at a pH of about 6.8–7.8 to convert the iron sulfide into insoluble iron oxide and free sulfur, continuing the oxidation until the iron sulfide is reduced to not less than about 0.2–0.5% by weight of the total slurry, separating the ammonium sulfate from the resulting slurry, treating the residue with aqueous alkali to solubilize the ferrocyanides, separating the free sulfur by flotation, and separating the solubilized ferrocyanides from the insoluble iron oxide residue.

3. The method of treating iron sulfate containing pickle liquor with raw coke oven gas for purifying said gas and recovering useful values which comprises: reacting raw coke oven gas with iron sulfate containing pickle liquor, completing the reaction at a pH of about 7.5–7.8, thereby to precipitate substantially all iron present as insoluble iron sulfide and ferrocyanides and all pyridine present as insoluble pyridine ferrocyanides, in an aqueous solution of ammonium sulfate, oxidizing the resulting slurry with agitation to free the pyridine present and to evolve the same, and to convert the iron sulfide into free sulfur and insoluble iron oxide, continuing the oxidation until the iron sulfide is reduced to not less than about 0.2–0.5% by weight of the total slurry, separating the ammonium sulfate from the resulting slurry, treating the residue with aqueous alkali to solubilize the ferrocyanides, separating the free sulfur by flotation, and separating the solubilized ferrocyanides from the insoluble iron oxide residue.

4. The method of treating iron sulfate containing pickle liquor with raw coke oven gas containing ammonia, hydrogen sulfide and cyanide and pyridine for purifying the gas and recovering useful values, which comprises: establishing a countercurrent flow of said liquor and gas in a vertical absorption tower and so adjusting the rates of flow as to establish and maintain a pH value at the base of the tower of about 7.5–7.8, thereby to produce by reaction of said constituents, aqueous ammonium sulfate solution and insoluble iron sulfide, ferrocyanide and pyridine compounds; withdrawing the reacted slurry from the base of the tower and oxidizing with agitation at a pH of about 6.8–7.8 to drive off said pyridine and to decompose said iron sulfide and to form iron oxide; continuing the oxidation until the iron sulfide is reduced to not less than about 0.2–0.5% by weight of the total slurry, centrifuging the resulting slurry to separate the ammonium sulfate solution from the solids comprising the insoluble iron oxides, ferrocyanides and sulfur; admixing the resulting slurry with alkali to solubilize the ferrocyanides, recovering the free sulfur of said slurry therein by flotation, and centrifuging the resulting slurry to separate said ferrocyanides from the iron oxide.

5. The method of treating iron sulfate containing pickle liquor with raw coke oven gas containing ammonia, hydrogen sulfide and cyanide and pyridine for purifying the gas and recovering useful values, which comprises: establishing a countercurrent flow of said liquor and gas in a vertical absorption tower, including bubbling said gas through lower and upper level pickle liquor baths, said levels being selected such as to maintain for a minimum time the pH of said baths in the range of 3.5–6.5, while so adjusting the rates of flow of said gas and pickle liquor as to establish and maintain a pH value at the base of said tower at about 7.5–7.8, thereby to produce by reaction of said constituents, a slurry comprising an aqueous ammonium sulfate solution and insoluble iron sulfide, ferrocyanide and pyridine compounds; withdrawing the reacted slurry from the base of said tower and oxidizing with agitation at a pH of about 6.8–7.8 to free and drive off said pyridine and to decompose said iron sulfide to form iron oxide and free sulfur; continuing the oxidation until the iron sulfide is reduced to not less than about 0.2–0.5% by weight of the total slurry, centrifuging the resulting slurry to separate the ammonium sulfate solution from the solids comprising the insoluble iron oxide, ferrocyanides and sulfur; admixing the resulting slurry with an alkali to solubilize the ferrocyanides; separating the sulfur by flotation; and centrifuging the resulting slurry to separate the ferrocyanides from the iron oxide.

6. The method of treating iron sulfate containing pickle liquor with raw coke oven gas for purifying said gas and recovering useful values which comprises: reacting raw coke oven gas with iron sulfate containing pickle liquor, completing the reaction at a pH of about 7.5–7.8, thereby to precipitate substantially all ferrous iron present as insoluble iron sulfide and ferrocyanides and to form a slurry thereof with ammonium sulfate solution, oxidizing the resulting slurry to convert the iron sulfide into insoluble iron oxide and free sulfur, continuing the oxidation until the iron sulfide is reduced to not less than about 0.2–0.5% by weight of the total slurry, separating the ammonium sulfate solution from said slurry, separating the free sulfur from the resulting slurry by flotation, treating the residue with alkali to solubilize the ferrocyanides, and separating the solubilized ferrocyanides from the insoluble iron oxide.

7. The method of treating iron sulfate containing pickle liquor with raw coke oven gas containing ammonia, hydrogen sulfide and cyanide and pyridine for purifying the gas and recovering useful values, which comprises: establishing a countercurrent flow of said liquor and gas in a vertical absorption tower and so adjusting the rates of flow as to establish and maintain a pH value at the base of the tower of about 7.5–7.8, thereby to produce by reaction of said constituents, aqueous ammonium sulfate solution and insoluble iron sulfide, ferrocyanide and pyridine compounds; withdrawing the reacted slurry from the base of the tower and oxidizing with agitation at a pH of about 6.8–7.8 to drive off said pyridine and to decompose said iron sulfide and to form iron oxide; continuing the oxidation until the iron sulfide is reduced to not less than about 0.2–0.5% by weight of the total slurry, centrifuging the resulting slurry to separate the ammonium sulfate solution from the solids comprising the insoluble iron oxides, ferrocyanides and sulfur; admixing the resulting slurry with alkali to solubilize the ferrocyanides, recovering the free sulfur of said slurry therein by flotation, centrifuging the resulting slurry to separate said ferrocyanides from the iron oxide, and recycling a portion of said iron oxide to said absorption tower for increasing the hydrogen sulfide recovery therein.

References Cited in the file of this patent
UNITED STATES PATENTS

| | | |
|---|---|---|
| 961,763 | Falding | June 21, 1910 |
| 1,414,441 | Sperr | May 12, 1922 |
| 1,837,079 | Sommer | Dec. 15, 1931 |
| 2,366,915 | Lento et al. | Jan. 9, 1945 |
| 2,427,555 | Elzi | Sept. 16, 1947 |
| 2,511,306 | Tiddy | June 13, 1950 |
| 2,712,980 | Hoak | July 12, 1955 |